United States Patent [19]

Sitter, Jr. et al.

[11] Patent Number: 5,680,252
[45] Date of Patent: Oct. 21, 1997

[54] MINIATURE HYBRID OPTICAL IMAGING LENS

[75] Inventors: David N. Sitter, Jr.; Marc L. Simpson, both of Knoxville, Tenn.

[73] Assignee: Martin Marietta Energy Systems, Inc., Oak Ridge, Tenn.

[21] Appl. No.: 409,390

[22] Filed: Mar. 23, 1995

[51] Int. Cl.⁶ .................. G02B 5/28; G02B 27/44; G02B 27/42

[52] U.S. Cl. .................. 359/566; 359/569; 359/571; 359/565; 359/558

[58] Field of Search .................. 359/19, 565, 566, 359/572, 692, 795, 569, 571

[56] References Cited

U.S. PATENT DOCUMENTS

| | | | |
|---|---|---|---|
| 2,873,643 | 3/1959 | St-Genies | 359/692 |
| 3,891,975 | 6/1975 | Deml et al. | 359/566 |
| 5,227,915 | 7/1993 | Grossinger et al. | 359/565 |
| 5,349,471 | 9/1994 | Morris et al. | 359/566 |

*Primary Examiner*—Paul M. Dzierzynski
*Assistant Examiner*—Audrey Chang
*Attorney, Agent, or Firm*—James M. Spicer

[57] ABSTRACT

A miniature lens system that corrects for imaging and chromatic aberrations, the lens system being fabricated from primarily commercially-available components. A first element at the input to a lens housing is an aperture stop. A second optical element is a refractive element with a diffractive element closely coupled to, or formed a part of, the rear surface of the refractive element. Spaced closely to the diffractive element is a baffle to limit the area of the image, and this is closely followed by a second refractive lens element to provide the final correction. The image, corrected for aberrations exits the last lens element to impinge upon a detector plane were is positioned any desired detector array. The diffractive element is fabricated according to an equation that includes, as variables, the design wavelength, the index of refraction and the radius from an optical axis of the lens system components.

13 Claims, 2 Drawing Sheets

MINIATURE HYBRID OPTICAL IMAGING LENS

This invention was made with Government support under Contract DE-AC05-84OR21400 awarded by the United States Department of Energy to Martin Marietta Energy Systems, Inc., and the U.S. Government has certain rights in this invention.

TECHNICAL FIELD

The present invention relates generally to multiple lens imaging systems, and more particularly to an extremely small and light weight lens system that corrects for imaging and chromatic aberrations whereby near-television quality picture transmission is achieved.

BACKGROUND ART

A large number of applications in today' technology require the use of small and light weight "television" cameras. Typical of such uses, but not limited to, are camcorders, surveillance cameras, etc. The physical laws of optics govern the formation of images, with refraction, reflection, and diffraction each affecting the transmission of light through a series of lenses. In addition to the curvature of each lens surface, image quality is affected by the wavelength of the light forming the image, since the index of refraction of glass is a function of wavelength. Traditionally, imaging aberrations are reduced by adding compensating lenses. Lens systems consisting of six lens elements are common. Lens systems of the Cooke triplet type (having three lens elements) represent the minimal practical configuration. Typical of miniature commercial lens systems are:

1. Securis Model TVX;
2. Sony Model XC-999;
3. Toshiba Model IK-M40A;
4. Fulnix Models TM-540 and TM-545W;
5. Watec Models WAT-906 and WAT-307;
6. Marshall Model V1206.

The larger number of lens units increases the difficulty of lens alignment (with fixtures). Also, the increase of number of lenses increases both the length and weight of the system. The typical "small" commercial lens system is typically 15 to 50 mm long, and weighs 3 to 8 oz.

Accordingly, it is an object of the present invention to provide a lens system having a shorter distance from the first lens element to its detector plane and good aberration reduction.

Another object of the invention is to provide a lens system having reduced weight compared to those of the prior art.

It is still another object of the present invention to provide a lens system wherein a very thin diffractive optical element is added to correct for aberrations without adding substantially to the weight of the system.

These and other objects of the present invention will become apparent upon a consideration of the drawings referred to hereinafter, and a complete description thereof.

SUMMARY OF THE INVENTION

In accordance with the present invention, there is provided a small and light weight lens system that utilizes six principal components arranged along an axis of the system. There is an initial optical stop to define the aperture of the system. In one embodiment a convex-plano refraction lens is positioned behind the stop, the curvature of the convex surface being spherical. A thin diffractive optical element immediately follows the refraction lens, either being attached thereto or formed thereon. In this embodiment, it is a sixteen level binary optical element designed at a center wavelength of 0.5876 micrometers. Element No. 4 is a field stop (baffle), and in this embodiment this is followed by a concave-plano lens, with the concave surface having a spherical curvature. Immediately following the last lens is the detector plane for receiving a semiconductor detector array or other form of imaging detector.

BEST MODE FOR CARRYING OUT THE INVENTION

Figure 1:
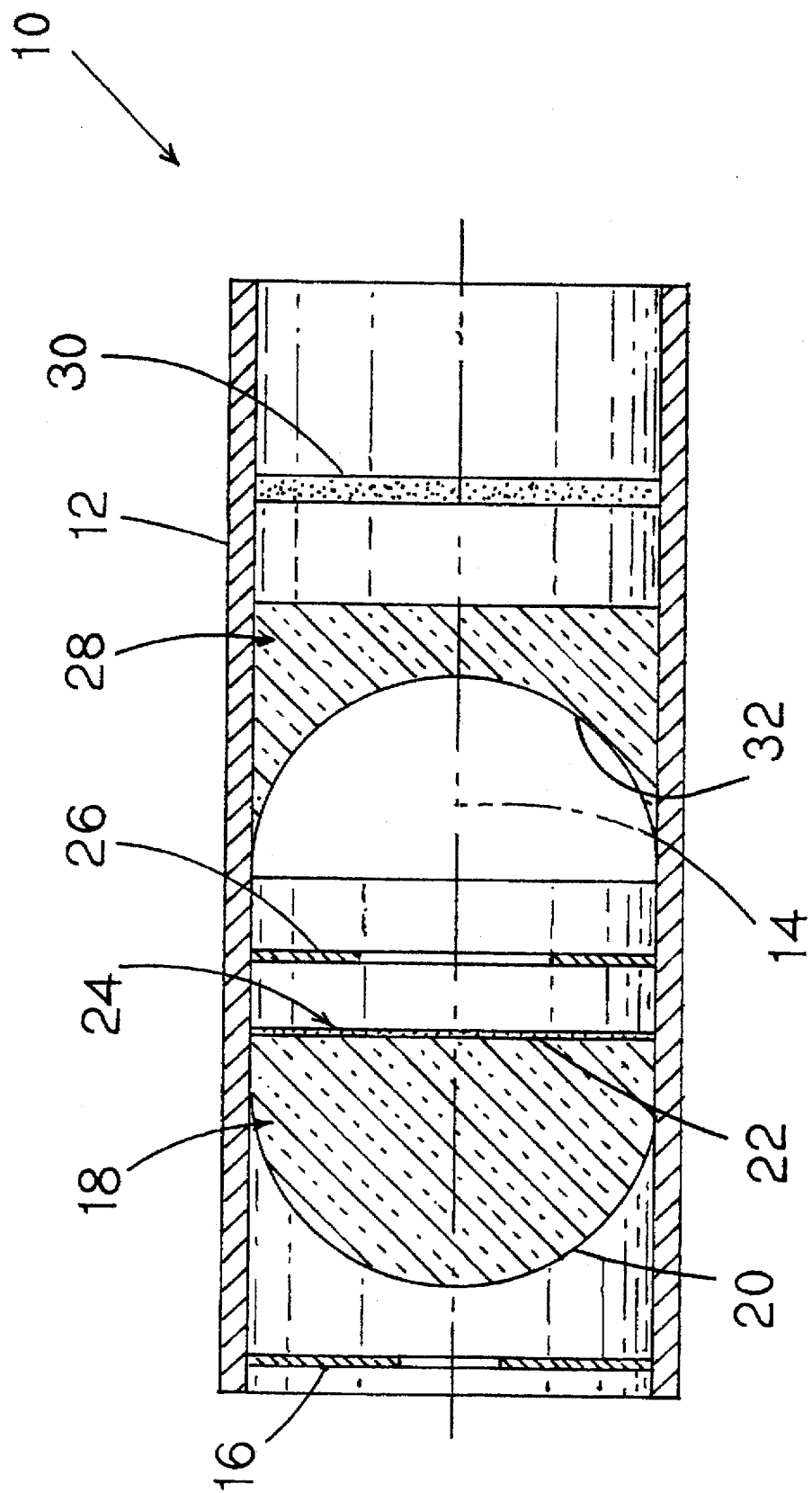
FIG. 1 is a schematic drawing illustrating a lens system developed to accomplish the above-stated objects.

Referring first to FIG. 1, shown schematically therein at 10 is a lens system developed to accomplish the objects of the invention. There are six essential elements encased in a housing 12 having an optical axis 14. All of the enumerated elements are mounted to have an optical axis corresponding to the axis 14 of the system.

Light from a distant object enters the system 10 through a fixed aperture stop (it could be variable) 16. Spaced closely to this stop 16 is a refractive lens in the form of a convex-plano lens 18. The convex surface 20 of lens 18 is typically spherical. Although a refractive lens with other radii of curvature could be utilized, thereby giving more degrees of freedom for optimization, this particular lens is readily available and functions sufficiently for this application. Immediately adjacent to the planar surface 22 of lens 18, or formed as a part thereof, is a diffractive optical element 24. Details of the surface thereof are sketched in FIG. 2. This surface is formed to approximate the phase profile given by the following equation.

$$\Phi(r) = 2\frac{\pi}{\lambda}[a_2 r^2 + a_4 r^4 + a_6 r^6]$$

where $\Phi(r)$ is the phase (related to thickness), $\lambda$ is the design wavelength, r is the radius from the optical axis 14, and $a_2$, $a_4$, $a_6$ are coeffecients for $r^2$, $r^4$ and $r^6$, respectively. The phase distribution could be implemented by a continuously varying surface relief; however, such a surface is difficult to fabricate. It can be approximated by steps as a binary surface. Such a stepped surface can be formed by photolithographic methods, ion milling or other processes for providing very shallow and narrow steps. As stated, this can be formed directly upon the planar surface of the refractive lens 18, or can be formed separately and applied to that planar surface.

Immediately following the diffractive optical element 24 is a baffle 26 which serves as a "field stop", generally having an area greater than the stop 16. Another refractive lens 28, in the form of a concave-plano lens, performs as a field flattener. The concave surface 32 of lens 28 is typically spherical. In the embodiment illustrated, the radius of curvature of the concave surface 32 matches the curvature of the convex surface 20. However, as with the first lens configuration, other radii of curvature could be chosen to provide the needed correction for aberrations.

Figure 2:
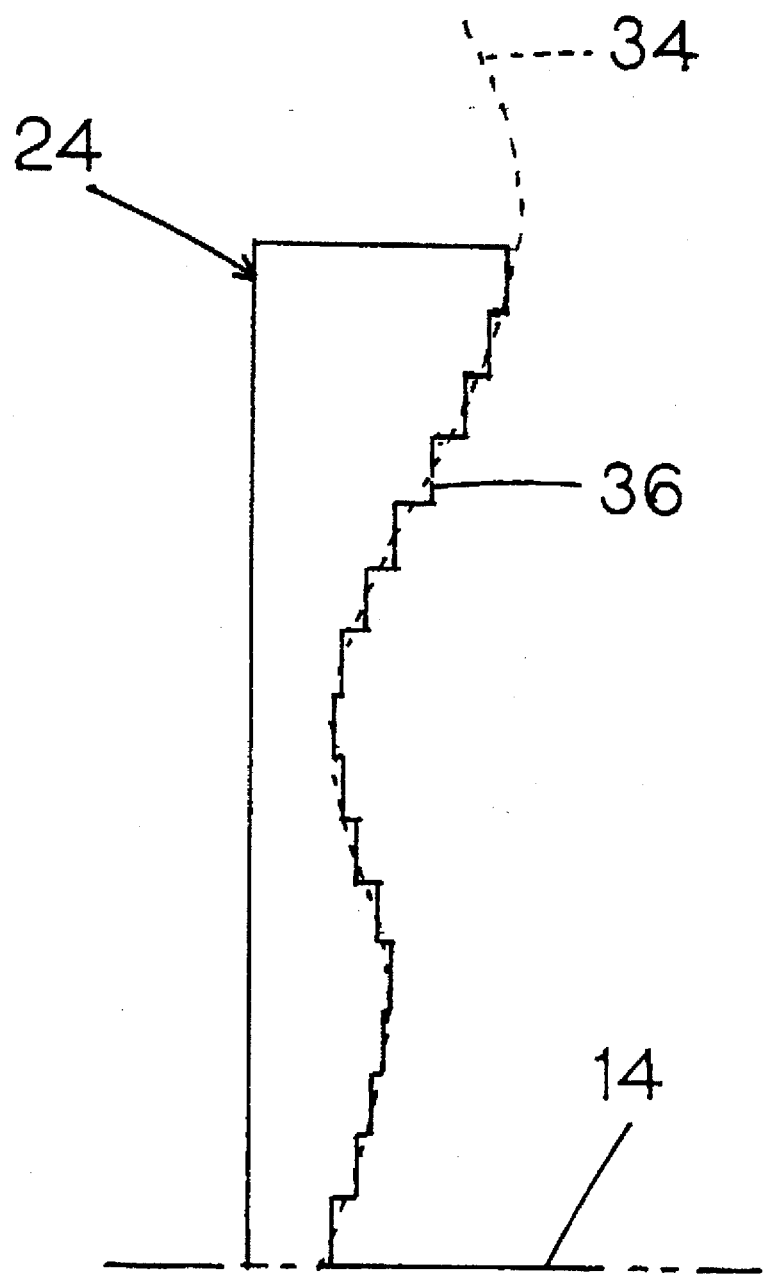
FIG. 2 is an enlarged drawing illustrating the diffractive optical element utilized in the present invention, with a binary step surface approximation to the desired phase profile. Both illustrated contours are only simulations.

FIG. 2 illustrates how a continuously varying thickness for the diffractive element 24 can be approximated with binary steps. This is shown greatly enlarged for purpose of illustration. Further, the continuously varying curvature 34 is not that computed from the above-listed equation: it is just an illustration of the type of diffractive lens. It can be seen that this curvature 34 can be approximated by a series of steps 36, these being more easily fabricated. As set forth above, such a stepped surface can be fabricated using conventional photolithographic processes, by ion milling, etc., all of which will be known by persons skilled in the art. FIG. 2 only shows a one-dimensional radial contour of the diffractive element; the full surface being a surface of revolution generated by the one-dimensional contour around the optical axis 14. Further, this drawing illustrates a sixteen level lens as utilized in the present invention; however, any number of steps could be used to approximate the results of the computation of the equation.

An embodiment of the lens system described herein was constructed having the following specifications. The lens system had an F/# of 5, a focal length of 6.1 mm and a full field of view of 30°. The aperture stop 16 had a clear aperture diameter of 1.22 mm. This was spaced 1 mm from the vertex of the convex-plano refractive lens 18. The radius of curvature of the convex surface 20 was 3.101 mm, and the thickness along the optical axis 14 was 3 mm. This lens was made from BK7 glass and had a diameter of 6 mm. The flat rear surface was etched by photolithographic techniques to form a sixteen level diffractive surface to approximate the above-cited equation. This rear surface was positioned in the system so as to be 0.5 mm from the field stop 26, this stop or baffle having a clear aperture diameter of 2.14 mm. The stop/baffle 26 was positioned 2.814 mm from the vertex of the final refractive lens element 28. This element 28 was fabricated from BK7 glass, with the concave surface 32 having a radius of curvature of −3.101 mm, a diameter of 6 mm, and a center thickness of 0.5 mm. The planar rear surface was positioned 0.1775 mm from the detector plane 30. These dimensions produced a total lens system only 8 mm long from the first lens element to the detector plane.

For this particular lens the diffractive element 24 was designed for an object two (2) meters from the lens and a center wavelength of 0.5876 micrometers and optimized for chromatic aberrations over the visible wavelength range of 0.4871 to 0.6563 micrometers. The values for $a_2$, $a_4$ and $a_6$ in the previous equation were $8.475 \times 10^{-3}$, $-8.792 \times 10^{-3}$ and $1.591 \times 10^{-3}$, respectively, and where r and $\lambda$ are expressed in millimeters.

From the foregoing, it will be recognized that a very small lens system has been provided that has many uses. These uses include, but are not limited to, space projects, visual systems for robotic machinery, surveillance, and other applications where the camera must be as unobtrusive as possible.

We claim:

1. A small imaging lens system for producing an image on a detector plane and correcting for imaging and chromatic aberrations without adding length or weight, said lens system comprising:

a positive refractive optical lens for forming said image;

a thin diffractive lens positioned in close relationship and conforming to a contour of the rear surface of said positive refractive optical lens to correct for imaging and chromatic aberrations;

and a negative refractive optical lens for further correction of said image.

2. The lens system of claim 1 wherein said positive refractive optical lens, said thin diffractive lens and said negative refractive optical lens are oriented upon a common optical axis.

3. The lens system of claim 2 further comprising:

an input aperture stop prior to said positive refractive optical lens to limit light impinging upon said positive refractive optical lens, said input aperture stop having an opening centered on said optical axis; and a second aperture stop between said diffractive optical lens and said negative refractive optical lens to delineate an area of corrected image for impinging upon said negative refractive optical lens, said second aperture stop having an opening centered on the optical axis.

4. The lens system of claim 2 further comprising a housing for mounting said optical lenses and aperture stops along said optical axis.

5. The lens system of claim 2 wherein:

said positive refractive optical lens has a spherical convex input surface and a planar output surface;

said diffractive lens is formed on said planar output surface; and said negative refractive optical lens has a spherical concave input surface and a planar output surface.

6. The lens system of claim 2 wherein said diffractive binary level optical lens approximates a surface described by an equation $$\phi(r) = 2\frac{\pi}{\lambda} [a_2 r^2 + a_4 r^4 + a_6 r^6]$$

where $\Phi(r)$ is the phase (related to thickness), $\lambda$ is the design wavelength, r is the radius from the optical axis and $a_2$, $a_4$, $a_6$ are coefficients of $r^2$, $r^4$ and $r^6$, respectively.

7. The lens system of claim 6 wherein said diffractive lens has sixteen levels to approximate said surface described by said equation.

8. A small imaging lens system for producing an image on a detector plane and correcting for imaging and chromatic aberrations without adding length or weight, said lens system comprising:

a housing to define an optical axis, said housing having an input end and an output end;

an input aperture stop proximate said input of said housing to limit an amount of light entering said system, said input aperture stop having an opening centered on the optical axis;

a positive refractive optical lens positioned on the optical axis for forming said image;

a thin diffractive binary level optical lens positioned on the optical axis in close relationship and conforming to a contour of rear surface of said positive refractive optical lens to correct for imaging and chromatic aberrations;

a second aperture stop positioned adjacent said diffractive lens to delineate an area of a corrected image, said second aperture stop having an opening centered on the optical axis; and a negative refractive optical lens positioned on the optical axis for flattening the field curvature and focusing said corrected image passing through said second aperture stop upon said detector plane.

9. The lens system of claim 8 wherein:

said positive refractive optical lens has a spherical convex input surface and a planar rear surface;

said diffractive lens is formed on said planar rear surface; and said negative refractive optical lens has a spherical concave input surface and a planar output surface.

10. The lens system of claim 8 wherein said diffractive binary level optical lens approximates a surface described by an equation $$\phi(r) = 2\frac{\pi}{\lambda}\ [a_2 r^2 + a_4 r^4 + a_6 r^6]$$

where $\Phi(r)$ is the phase (related to thickness), $\lambda$ is the design wavelength, r is the radius from the optical axis and $a_2$, $a_4$, $a_6$ are coefficients of $r^2$, $r^4$ and $r^6$, respectively.

11. The lens system of claim 10 wherein said diffractive lens has sixteen levels to approximate said surface described by said equation.

12. A small imaging lens system having an optical axis for producing an image of detector plane and correcting for imaging and chromatic aberrations without adding length or weight, said lens system comprising:

a housing to define the optical axis, said housing having an input end and an output end;

an input aperture stop proximate said input of said housing to limit an amount of light entering said system, said input aperture stop having an opening centered on the optical axis;

a positive refractive optical lens positioned on the optical axis for forming said image, said positive refractive optical lens having a spherical input surface and a planar rear surface;

a thin diffractive lens positioned on the optical axis and formed on said rear surface of said positive refractive optical lens to correct for imaging and chromatic aberrations;

a second aperture stop positioned adjacent said diffractive lens to delineate an area of a corrected image, said second aperture stop having an opening centered on the optical axis;

and a negative refractive optical lens positioned on the optical axis for flattening the field curvature and focusing a corrected image passing through said second aperture stop upon said detector plane, said negative refractive optical lens having a spherical input surface and a planar output surface.

13. The lens system of claim 12 wherein said diffractive lens has sixteen steps to approximate an equation $$\phi(r) = 2\frac{\pi}{\lambda}\ [a_2 r^2 + a_4 r^4 + a_6 r^6]$$

where $\Phi(r)$ is the phase (related to thickness), $\lambda$ is the design wavelength, r is the radius from the optical axis, and $a_2$, $a_4$, $a_6$ are coefficients of $r^2$, $r^4$ and $r^6$, respectively.

* * * * *